United States Patent
Geist

(10) Patent No.: US 11,070,612 B2
(45) Date of Patent: *Jul. 20, 2021

(54) SYSTEM AND METHOD FOR PROVIDING DATA AND APPLICATION CONTINUITY IN A COMPUTER SYSTEM

(71) Applicant: GEMINARE INC., Toronto (CA)

(72) Inventor: Joshua B. Geist, Toronto (CA)

(73) Assignee: Geminare Inc., Toronto (CA)

( * ) Notice: Subject to any disclaimer, the term of this patent is extended or adjusted under 35 U.S.C. 154(b) by 180 days.

This patent is subject to a terminal disclaimer.

(21) Appl. No.: 16/145,516

(22) Filed: Sep. 28, 2018

(65) Prior Publication Data

US 2019/0037009 A1    Jan. 31, 2019

Related U.S. Application Data

(63) Continuation of application No. 15/614,494, filed on Jun. 5, 2017, now Pat. No. 10,110,667, which is a
(Continued)

(51) Int. Cl.
*H04L 29/08* (2006.01)
*H04L 29/06* (2006.01)
(Continued)

(52) U.S. Cl.
CPC .............. *H04L 67/10* (2013.01); *H04L 29/14* (2013.01); *H04L 51/30* (2013.01); *H04L 63/10* (2013.01);
(Continued)

(58) Field of Classification Search
CPC ..... H04L 67/10; H04L 67/42; H04L 67/1095; H04L 67/1097; H04L 69/40; H04L 29/14;
(Continued)

(56) References Cited

U.S. PATENT DOCUMENTS 5,321,841 A    6/1994  East et al.
5,544,347 A    8/1996  Yanai et al.
(Continued)

FOREIGN PATENT DOCUMENTS

CA    2621238 A1    4/2007
EP    1143660 A2 * 10/2001 ........... H04L 69/329
(Continued)

OTHER PUBLICATIONS

Canadian Office Action dated Oct. 14, 2016 issued in Canadian Application No. 2,720,082, 3 pages.
(Continued)

*Primary Examiner* — Kostas J Katsikis
(74) *Attorney, Agent, or Firm* — Foley & Lardner LLP

(57) ABSTRACT

A continuity system provides or maintains data and application continuity. According to an embodiment, the system comprises a communication interface for a client system, a network layer for receiving data from the client system, a hardware infrastructure for creating instances of the client system for replicating data, and an applications module for executing one or more applications on the replicated data. According to a further aspect, the system includes a portal interface configured for providing a remote user with control, audit and other functions associated with the user's system configuration.

36 Claims, 11 Drawing Sheets

Related U.S. Application Data continuation-in-part of application No. 13/364,394, filed on Feb. 2, 2012, now Pat. No. 9,674,268, which is a continuation of application No. 12/099,367, filed on Apr. 8, 2008, now Pat. No. 8,135,838, said application No. 15/614,494 is a continuation of application No. 14/639,352, filed on Mar. 5, 2015, now Pat. No. 9,860,310, which is a continuation-in-part of application No. 12/099,367.

(51) Int. Cl.
  *H04L 29/14* (2006.01)
  *H04L 12/58* (2006.01)

(52) U.S. Cl.
  CPC ...... *H04L 67/1095* (2013.01); *H04L 67/1097* (2013.01); *H04L 67/42* (2013.01); *H04L 69/40* (2013.01)

(58) Field of Classification Search
  CPC ..... H04L 51/30; H04L 63/10; H04L 67/1002; H04L 67/1034; H04L 67/1048; H04L 41/06; H04L 45/28; H04L 49/557
  See application file for complete search history.

(56) References Cited

U.S. PATENT DOCUMENTS

| | | | |
|---|---|---|---|
| 5,812,793 A | 9/1998 | Shakib et al. | |
| 6,079,020 A | 6/2000 | Liu | |
| 6,108,701 A | 8/2000 | Davies et al. | |
| 6,304,973 B1 | 10/2001 | Williams | |
| 6,335,937 B1 | 1/2002 | Chao et al. | |
| 6,571,245 B2 | 5/2003 | Huang et al. | |
| 6,618,806 B1 | 9/2003 | Brown et al. | |
| 6,658,590 B1* | 12/2003 | Sicola | G06F 11/1471 714/15 |
| 6,691,244 B1* | 2/2004 | Kampe | G06F 11/00 714/4.1 |
| 6,694,447 B1 | 2/2004 | Leach et al. | |
| 6,711,575 B1 | 3/2004 | Applewhite et al. | |
| 6,769,071 B1* | 7/2004 | Cheng | G06F 11/201 714/26 |
| 6,775,230 B1* | 8/2004 | Watanabe | H04L 49/357 370/218 |
| 6,871,296 B2* | 3/2005 | Kashyap | G06F 11/2005 709/227 |
| 7,039,827 B2* | 5/2006 | Meyer | G06F 3/0632 714/4.11 |
| 7,213,246 B1 | 5/2007 | van Rietschote et al. | |
| 7,225,249 B1 | 5/2007 | Barry et al. | |
| 7,383,463 B2 | 6/2008 | Hayden et al. | |
| 7,395,352 B1 | 7/2008 | Lam et al. | |
| 7,406,473 B1* | 7/2008 | Brassow | H04L 67/1097 |
| 7,487,383 B2 | 2/2009 | Bensinger | |
| 7,593,966 B2* | 9/2009 | Therrien | G06F 11/1448 |
| 7,640,451 B2* | 12/2009 | Meyer | G06F 3/0607 714/4.11 |
| 7,669,020 B1 | 2/2010 | Shah et al. | |
| 7,770,059 B1 | 8/2010 | Glade et al. | |
| 7,809,892 B1 | 10/2010 | Chatterjee et al. | |
| 7,818,517 B1 | 10/2010 | Glade et al. | |
| 7,849,262 B1 | 12/2010 | Glade et al. | |
| 7,933,987 B2 | 4/2011 | Aidun et al. | |
| 8,010,836 B2* | 8/2011 | Fukui | G06F 11/2082 714/6.3 |
| 8,032,491 B1 | 10/2011 | Appellof et al. | |
| 8,135,838 B2 | 3/2012 | Geist | |
| 8,316,226 B1 | 11/2012 | Kshirsagar et al. | |
| 8,386,540 B1* | 2/2013 | McAlister | G06F 16/256 707/899 |
| 8,406,123 B2* | 3/2013 | Tai-Aviv | H04L 67/24 370/220 |
| 8,498,417 B1 | 7/2013 | Harwood et al. | |
| 8,549,114 B2 | 10/2013 | Reddy et al. | |
| 8,627,005 B1 | 1/2014 | Glade et al. | |
| 8,949,471 B2* | 2/2015 | Hall | H04L 41/12 709/250 |
| 9,002,786 B2 | 4/2015 | Geist | |
| 9,372,870 B1 | 6/2016 | Levy | |
| 2001/0047406 A1 | 11/2001 | Araujo et al. | |
| 2001/0047412 A1 | 11/2001 | Weinman, Jr. | |
| 2002/0007468 A1* | 1/2002 | Kampe | H04L 43/00 714/4.12 |
| 2002/0055972 A1* | 5/2002 | Weinman, Jr. | G06F 11/2071 709/203 |
| 2002/0087552 A1 | 7/2002 | Applewhite et al. | |
| 2002/0114341 A1* | 8/2002 | Sutherland | H04L 41/00 370/428 |
| 2002/0120763 A1* | 8/2002 | Miloushev | H04L 67/1023 709/230 |
| 2002/0143798 A1 | 10/2002 | Lisiecki et al. | |
| 2002/0156905 A1 | 10/2002 | Weissman | |
| 2002/0188711 A1* | 12/2002 | Meyer | G06F 3/0632 709/223 |
| 2003/0051021 A1 | 3/2003 | Hirschfeld et al. | |
| 2003/0055697 A1* | 3/2003 | Macken, Jr. | G06Q 10/0635 705/7.28 |
| 2003/0097361 A1 | 5/2003 | Huang et al. | |
| 2003/0110397 A1 | 6/2003 | Supramaniam et al. | |
| 2003/0120685 A1 | 6/2003 | Duncombe et al. | |
| 2003/0126348 A1 | 7/2003 | Jung | |
| 2003/0191773 A1 | 10/2003 | Alexander | |
| 2003/0195950 A1 | 10/2003 | Huang et al. | |
| 2004/0003050 A1* | 1/2004 | Lewis | H04L 29/06 709/208 |
| 2004/0006624 A1* | 1/2004 | Hawkinson | H04L 67/1095 709/227 |
| 2004/0030739 A1 | 2/2004 | Yousefi'zadeh | |
| 2004/0044761 A1* | 3/2004 | Phillipi | H04L 67/327 709/223 |
| 2004/0073677 A1 | 4/2004 | Honma et al. | |
| 2004/0117438 A1* | 6/2004 | Considine | H04L 67/1097 709/203 |
| 2004/0148397 A1* | 7/2004 | Aronoff | G06F 11/2025 709/227 |
| 2004/0172424 A1 | 9/2004 | Edelstein et al. | |
| 2004/0172574 A1 | 9/2004 | Wing et al. | |
| 2005/0005200 A1 | 1/2005 | Matena et al. | |
| 2005/0021567 A1 | 1/2005 | Holenstein et al. | |
| 2005/0114401 A1* | 5/2005 | Conkel | G06F 11/0793 |
| 2005/0149578 A1 | 7/2005 | Sustman et al. | |
| 2005/0166260 A1 | 7/2005 | Betts et al. | |
| 2005/0188021 A1 | 8/2005 | Rohland et al. | |
| 2005/0193245 A1 | 9/2005 | Hayden et al. | |
| 2005/0240558 A1 | 10/2005 | Gil et al. | |
| 2005/0278383 A1* | 12/2005 | Kazar | H04L 67/06 |
| 2006/0015584 A1* | 1/2006 | Ocko | H04L 69/40 709/219 |
| 2006/0015645 A1* | 1/2006 | Ocko | G06F 11/2023 709/238 |
| 2006/0031365 A1 | 2/2006 | Kay et al. | |
| 2006/0059163 A1* | 3/2006 | Frattura | H04L 63/30 |
| 2006/0112176 A1* | 5/2006 | Liu | H04L 29/12811 709/245 |
| 2006/0117212 A1* | 6/2006 | Meyer | H04L 49/357 714/4.11 |
| 2006/0143161 A1 | 6/2006 | Munro | |
| 2006/0161810 A1 | 7/2006 | Bao | |
| 2006/0282435 A1* | 12/2006 | Moon | G06F 11/1425 |
| 2006/0294417 A1 | 12/2006 | Awasthi et al. | |
| 2007/0011191 A1 | 1/2007 | Otokawa et al. | |
| 2007/0061180 A1 | 3/2007 | Offenberg | |
| 2007/0067435 A1 | 3/2007 | Landis et al. | |
| 2007/0078982 A1 | 4/2007 | Aidun et al. | |
| 2007/0174660 A1* | 7/2007 | Peddada | H04L 41/0663 714/4.1 |
| 2007/0180033 A1 | 8/2007 | Singh et al. | |
| 2007/0180448 A1 | 8/2007 | Low et al. | |
| 2007/0183441 A1 | 8/2007 | Medin | |
| 2007/0192157 A1 | 8/2007 | Gooch | |
| 2007/0255766 A1 | 11/2007 | Di Giglio et al. | |

(56) References Cited

U.S. PATENT DOCUMENTS

| | | |
|---|---|---|
| 2007/0256073 A1 | 11/2007 | Troung et al. |
| 2007/0271309 A1* | 11/2007 | Witriol ................ H04L 67/1095 |
| 2007/0288526 A1 | 12/2007 | Mankad et al. |
| 2007/0294319 A1 | 12/2007 | Mankad et al. |
| 2008/0016387 A1 | 1/2008 | Bensinger |
| 2008/0033966 A1 | 2/2008 | Wahl |
| 2008/0034259 A1 | 2/2008 | Ko et al. |
| 2008/0034415 A1 | 2/2008 | Chacko et al. |
| 2008/0201360 A1 | 8/2008 | Kohli |
| 2008/0208605 A1 | 8/2008 | Sinha et al. |
| 2008/0209145 A1 | 8/2008 | Ranganathan et al. |
| 2008/0222296 A1* | 9/2008 | Lippincott ............ G06F 16/275 709/227 |
| 2008/0270490 A1* | 10/2008 | Watterott ............ H04L 67/1095 |
| 2008/0270670 A1 | 10/2008 | Usami |
| 2008/0301674 A1 | 12/2008 | Faus |
| 2008/0313242 A1 | 12/2008 | Doerr |
| 2009/0019137 A1* | 1/2009 | Mishra ................ H04L 41/5054 709/220 |
| 2009/0019535 A1* | 1/2009 | Mishra ................... G06Q 30/04 726/12 |
| 2009/0119395 A1* | 5/2009 | Kodama ................ H04L 67/10 709/223 |
| 2009/0199177 A1 | 8/2009 | Edwards et al. |
| 2009/0254642 A1 | 10/2009 | Geist |
| 2009/0300607 A1 | 12/2009 | Ferris et al. |
| 2009/0300608 A1 | 12/2009 | Ferris et al. |
| 2010/0095077 A1 | 4/2010 | Lockwood |
| 2010/0169497 A1 | 7/2010 | Klimentiev et al. |
| 2010/0179959 A1 | 7/2010 | Shoens |
| 2011/0060753 A1 | 3/2011 | Shaked et al. |
| 2011/0072108 A1 | 3/2011 | Gopalakrishnan |
| 2011/0106756 A1 | 5/2011 | Geist |
| 2011/0153697 A1* | 6/2011 | Nickolov ................ H04L 67/10 707/827 |
| 2011/0270949 A1 | 11/2011 | Geist |
| 2012/0198023 A1 | 8/2012 | Geist |
| 2012/0323676 A1 | 12/2012 | Dublin, III et al. |
| 2015/0120916 A1* | 4/2015 | Frattura .............. H04L 63/1416 709/224 |
| 2015/0180961 A1 | 6/2015 | Geist |
| 2015/0350321 A1 | 12/2015 | Klose et al. |
| 2017/0118214 A1 | 4/2017 | Vainstein et al. |
| 2019/0037009 A1* | 1/2019 | Geist ....................... H04L 67/10 |

FOREIGN PATENT DOCUMENTS

| | | | |
|---|---|---|---|
| EP | 2266253 A1 | 12/2010 | |
| KR | 20020063342 A | 8/2002 | |
| WO | WO-0078004 A2 * | 12/2000 | ............ H04L 45/00 |
| WO | 0114987 A2 | 3/2001 | |
| WO | 2007024478 A2 | 3/2007 | |
| WO | 2009124390 A1 | 10/2009 | |

OTHER PUBLICATIONS

Architecture Strategies for Catching the Long Tail, Frederick Chong and Gianpaolo Carraro, Microsoft Corporation, Apr. 2006.

On Effective Offloading Services for Resource-Constrained Mobile Devices Running Heavier Mobile INternet written by Kun Yang, IEEE Communication Magazine 2008, pp. 56-63.

United States Non-Final Office Action issued in U.S. Appl. No. 13/364,394 dated May 15, 2013.

United States Final Office Action issued in U.S. Appl. No. 13/364,394 dated Dec. 3, 2013.

United States Non-Final Office Action issued in U.S. Appl. No. 13/364,394 dated Aug. 26, 2014.

United States Final Office Action issued in U.S. Appl. 13/364,394 dated May 19, 2015.

United States Non-Final Office Action issued in U.S. Appl. No. 13/364,394 dated Dec. 10, 2015.

United States Notice of Allowance issued in U.S. Appl. No. 13/364,394 dated Mar. 24, 2017.

United States Non-Final Office Action issued in U.S. Appl. No. 12/099,367 dated Jul. 17, 2009.

United States Final Office Action issued in U.S. Appl. No. 12/099,367 dated Jun. 30, 2010.

United States Non-Final Office Action issued in U.S. Appl. No. 12/099,367 dated Mar. 16, 2011.

United States Notice of Allowance issued in U.S. Appl. No. 12/099,367 dated Nov. 15, 2011.

International Preliminary Report on Patentability and Written Opinion issued in corresponding International Application No. PCT/CA2009/000454 dated Jul. 6, 2009.

International Search Report issued in International Application No. PCT/CA2009/000454 dated Jul. 6, 2009.

Offsite Desktop Management with VMWare Virtual Desktop Infrastructure—VMWare, Jun. 2007, https://www.vmware.com/pdf/vdi_solution_offsite_desktop.pdf.

* cited by examiner

FIG. 12

SYSTEM AND METHOD FOR PROVIDING DATA AND APPLICATION CONTINUITY IN A COMPUTER SYSTEM

CROSS-REFERENCE TO RELATED APPLICATIONS

This application is a continuation of U.S. application Ser. No. 15/614,494, filed Jun. 5, 2017 (now U.S. Pat. No. 10,110,667), which is a continuation-in-part of U.S. application Ser. No. 13/364,394, filed Feb. 2, 2012 (now U.S. Pat. No. 9,674,268), which is a continuation of U.S. application Ser. No. 12/099,367, filed Apr. 8, 2008 (now U.S. Pat. No. 8,135,838), all of which are incorporated by reference herein.

This application is a continuation of U.S. application Ser. No. 15/614,494, filed Jun. 5, 2017 (now U.S. Pat. No. 10,110,667), which is a continuation of U.S. application Ser. No. 14/639,352, filed Mar. 5, 2015 (now U.S. Pat. No. 9,860,310), which is a continuation-in-part of U.S. application Ser. No. 12/099,367, filed Apr. 8, 2008 (now U.S. Pat. No. 8,135,838), all of which are incorporated by reference herein.

FIELD OF THE INVENTION

The present application relates to computer systems, and more particularly to a system and methods for maintaining data and/or application continuity in a computer system for a business or enterprise.

BACKGROUND OF THE INVENTION

The uptime of the computer systems and data infrastructure for a business is critical to the operation of the enterprise. Equally or even more important is the recovery from a crash or system interruption. It has been estimated that at least 50% of a company's intellectual property resides in it email system.

Accordingly, there remains a need for improvements in the art for maintaining business data continuity.

BRIEF SUMMARY OF THE INVENTION

The present invention is directed to a method and/or system for maintaining data and/or application continuity in a computer system for a business or enterprise.

According to an aspect, the present invention provides a system for providing data continuity for one or more client systems, the system comprises: a communication interface configured to receive data from the one or more client systems; a security infrastructure configured to authorize communication with the one or more the client systems; a hardware infrastructure comprising a replication engine configured to create one or more virtual servers, and the one or more virtual servers being configured for storing at least some of the data received from the one or more client systems; and an applications module configured to run one or more application programs on some of the data received from one of the client systems, and the one or more application programs corresponding to application programs on the client system.

Other aspects and features of the present invention will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example, embodiments of the apparatus and methods described herein, and how they may be carried into effect, and in which:

FIG. 12 is a screen shot of a screen configured for managing/searching and accessing customer data for the control system and management portal of FIG. 8 according to an embodiment of the invention;

Like reference numerals indicate like or corresponding elements in the drawings.

DETAILED DESCRIPTION OF THE EMBODIMENTS

Figure 1:
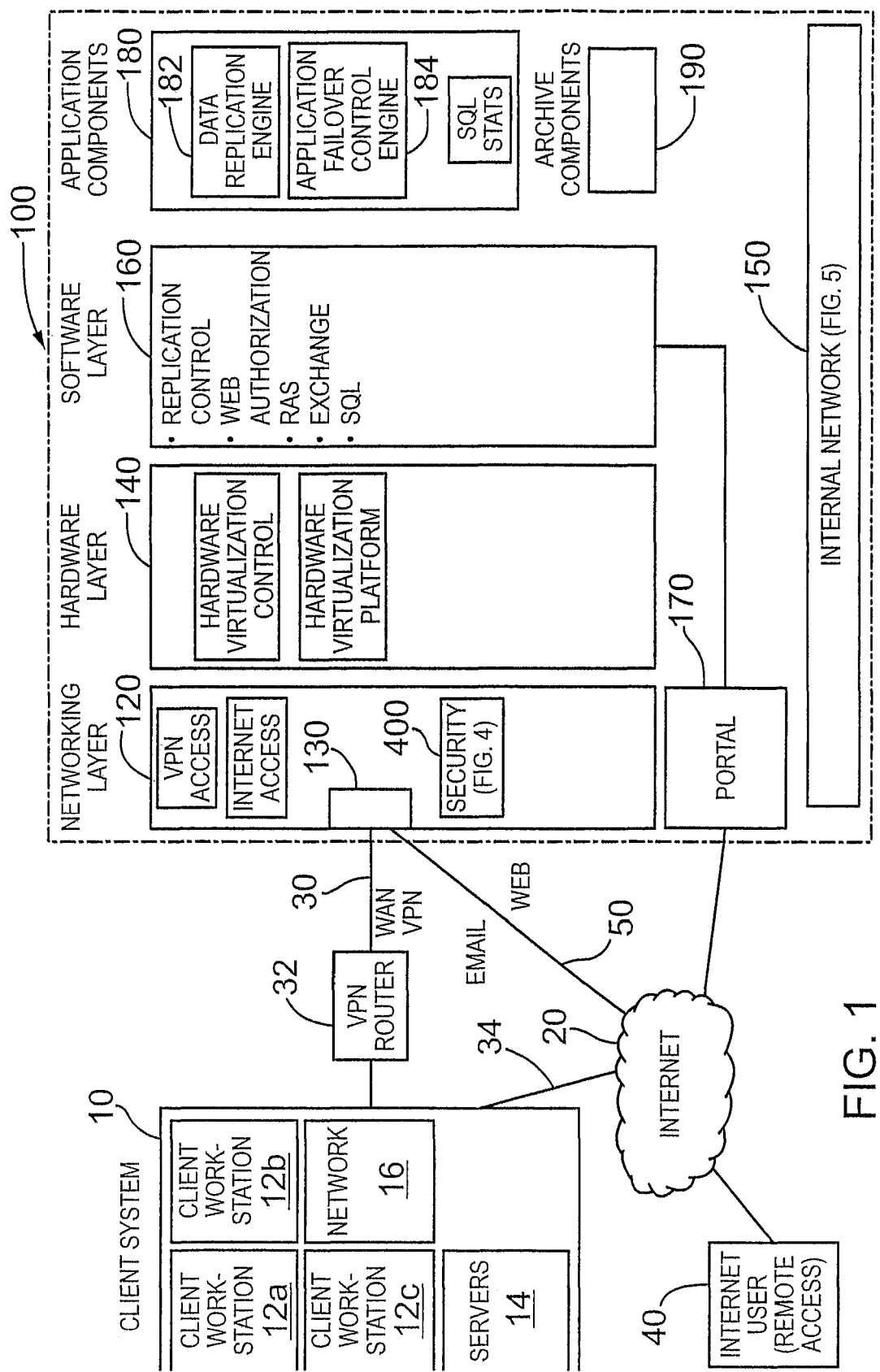
FIG. 1 shows in schematic form a system for maintaining business data continuity according to an embodiment of the present invention and in the context of an exemplary operating environment.

Reference is first made to FIG. 1, which shows a system 100 according to an embodiment to the present invention and in the context of an exemplary operating environment comprising a plurality of client systems, with one client system being depicted in FIG. 1 and indicated generally by reference 10. In the context of the present description, the system 100 comprises a system for configuring, storing and delivering data (e.g. business data), and a control platform for maintaining and managing the data and/or applications for providing business data continuity, as will be described in more detail below. In the present description, the system 100 is referred to as a business data and application continuity system (and method), or in the alternative, a data continuity system 100.

The data continuity system 100 comprises a networking layer or infrastructure 120, a hardware layer or infrastructure 140, a software layer or infrastructure 160, an application module or components 180, and an archive components or module 190. The exemplary client system 10 comprises client workstations 12, one or more servers 14, and a network structure 16. The functionality and operation of the data continuity system 100 is described in more detail below.

The networking layer 120 includes a network communication interface indicated generally by reference 130. The network communication interface 130 is configured to provide communication with the client system 10 via the Internet 20 and/or via a virtual private network (VPN) or wide area network (WAN) communication pathway or structure 30. The networking layer 120 and network communication interface 130 are described in more detail more.

As shown in FIG. 1, the data continuity system 100 includes a portal indicated by reference 170. The portal 170 provides an interface to the Internet 20 and provides users, i.e. subscribers or clients, access to certain applications and tools in the software layer 160. The data continuity system 100 also includes an internal network indicated by reference 150, which is described in more detail below with reference to FIG. 5. According to an embodiment, the internal network 150 comprises an infrastructure for providing/defining a plurality of private client or production networks. As will be described in more detail below, the internal network infrastructure 150 is used to configure a client private ("production") network for each client of the system 100.

Figure 2:
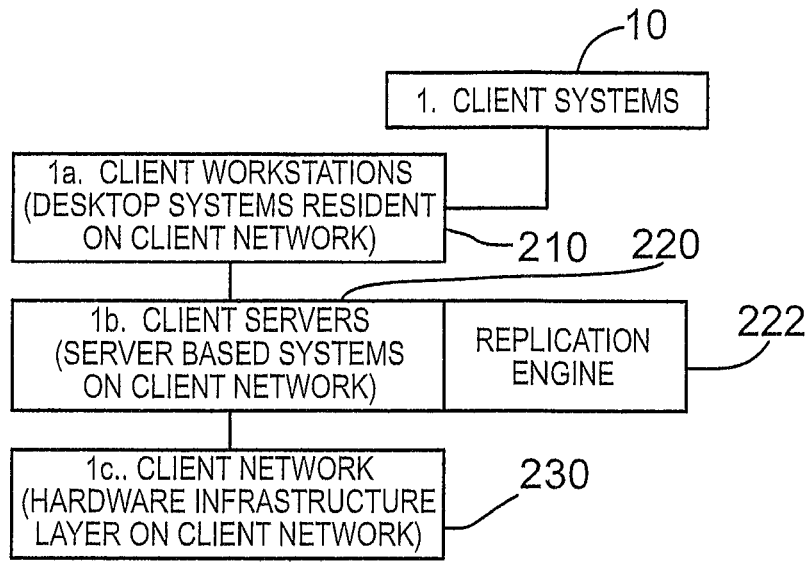
FIG. 2 shows in block diagram form an exemplary client system for the data continuity system of FIG. 1.

Reference is next made to FIG. 2, which shows the client system 10 in further detail. As described above, the client system 10 comprises one or more client workstations 210, client servers 220, and a client network 230. The client workstations comprise desktop computer systems, e.g. Windows XP workstations, which are resident on the client network 230. The client server 220 comprises one or more servers, including, for example, a Mail server such as Microsoft Exchange™ system, Database servers, such as MS SQL™ servers, an Active Directory server(s), an Application server(s) such as MS GreatPlains™ server(s), and/or a File server(s), such as a MS Server 2003™ server(s). The client network 230 is configured to provide a network configuration for the client workstations 210 and the client servers 220 via an Internet connection (i.e. a standard offering Internet Service Provider or ISP) and/or router device connecting the Internet 20 to a local area network (LAN).

As shown in FIG. 2, each of the client servers 220 includes a replication agent or engine according to an embodiment of the invention and indicated generally by reference 222. According to an embodiment, the replication engine 222 runs as a service under the operating system for the server 220 and is configured to capture stored data and transfer the captured data to replication servers running in the business data continuity system 100 as described in more detail below with reference to FIG. 7. According to an embodiment, the replication engine 222 is interchangeable with multiple forms of software replication engines. According to an embodiment, the replication engine 222 is configured to work with multiple application formats such as Mail, Database, Application and File systems from various vendors such as Microsoft and Oracle. Commonly referenced as "Client servers", these systems can be either physical or virtualized systems on the network.

In the context of the present description, the client workstations 210 are configured for information (data) creation and retrieval. According to another aspect, the client workstations 210 are configured to access the portal 170 (FIG. 1) for the data continuity system 100. In known manner, the client workstations 210 may be configured with Microsoft Windows XP™, Linux™ Macintosh™ and other operating systems.

According to an embodiment, the client network 230 comprises a combination of networking devices that are configured to provide an infrastructure layer to the client network 230 and also an interface or gateway to the networking layer 120 (FIG. 1) of the data continuity system 100. The networking devices comprise "routers, modems or access devices" and are configured/connected in known manner to provide the Internet connectivity and network communication capability between the client workstations 210 and the client server 230 devices and the data continuity system 100. According to an embodiment, direct connectivity between the client system 10 (FIG. 1) and the data continuity system 100 is provided by a standard WAN VPN capable router as indicated by reference 32 in FIG. 1.

Figure 3:
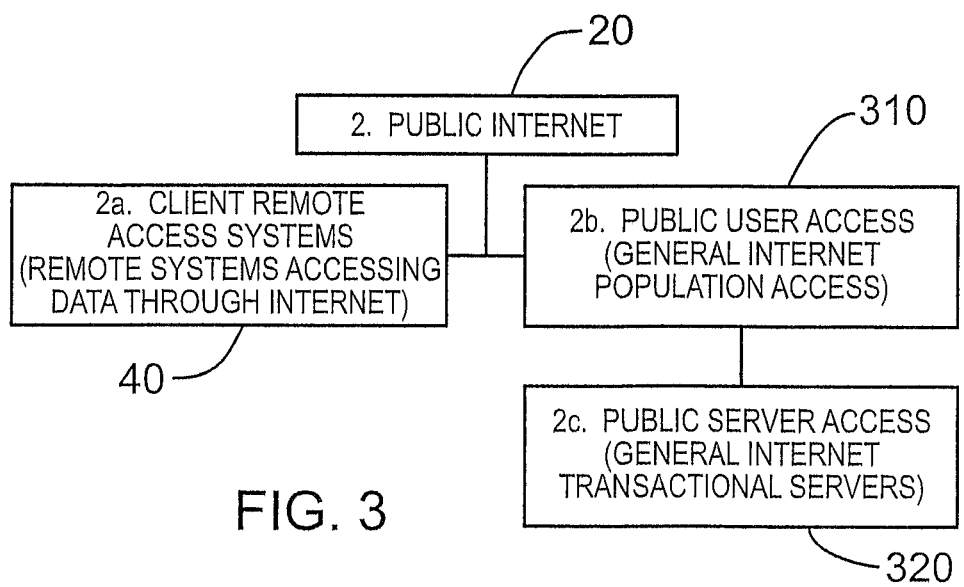
FIG. 3 shows in block diagram form an Internet interface for the data continuity system of FIG. 1 according to an embodiment of the invention.

Reference is next made to FIG. 3. The Internet in known manner comprises interconnected networks which span the globe and provide access to the users connected to them with services and information available both on public servers as well as private servers. In the context of the present description, the Internet configured communication interface 130 (FIG. 1) provides the capability for the client system 10 (FIG. 1) and other remote clients and/or servers to access and transfer data directly into the data continuity system 100, as will be described in more detail below.

According to an embodiment and as shown in FIG. 1, the client workstations 12 are configured to connect remotely to the business continuity data system 100 through the Internet 20, as opposed through the client network 16, i.e. the WAN 30 and the VPN router 32. According to another aspect, the Internet 20 provides access to an Internet user 40 (FIG. 1), i.e. a remote user, or a user without a directly connected system to the client network 16, who wishes to view or access the information hosted on the client server(s) 14.

Reference is made back to FIG. 3. According to another aspect, the Internet 20 provides access to public servers, i.e. servers on the Internet which are trying to exchange information with the client servers 14 (FIG. 1) in some specified format. This typically takes the form of email, database queries or website searches. An email server comprises a typical example of such a server. According to another embodiment, the communication interface 130 (FIG. 1) is configured to send and receive information in multiple formats with external and publicly hosted systems such as email servers, websites and database systems, as indicated by reference 50 in FIG. 1 and the reference 310 in FIG. 3. For example, such systems typically comprise desktop machines, notebook computers and/or mobile wireless communication devices or PDA's, that are configured to access data on the client servers 14 through the Internet 20. According to this aspect, servers coupled to the Internet are capable of sending and receiving communications in a wide variety of formats to the hosted servers and systems associated with the data continuity system 100, as represented by reference 320 in FIG. 3.

According to another aspect, the data continuity system 100 includes a portal indicated by reference 170 in FIG. 1. The portal 170 is configured as a public portal or interface to provide publicly available access, i.e. via the Internet 20, to certain private control and/or setup functions in the data continuity system 100, as will be described in more detail below. According to an embodiment, the portal 170 comprises a secured web site, having a secured website page available on the Internet, for example, with URL http://www.geminare.com. As will be described in more detail below, the portal 170 and secured webpage mechanism provides access to authorized users and the ability to manage and control all their systems from any publicly available system 40 (FIG. 1), as will be described in more detail below with reference to FIG. 7.

Figure 4:
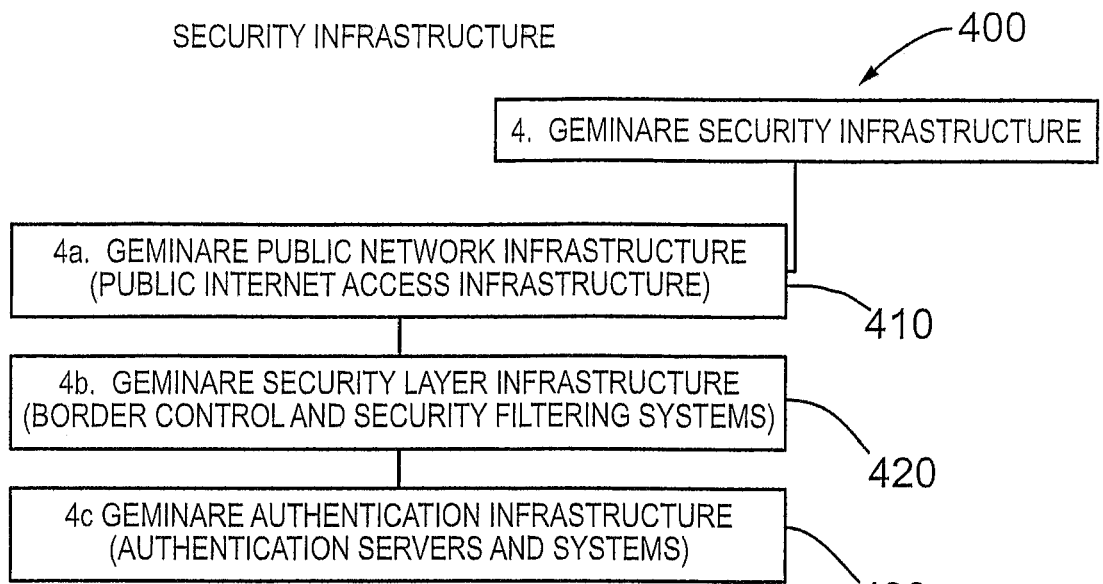
FIG. 4 shows in block diagram form a security infrastructure for the data continuity system of FIG. 1 according to an embodiment of the invention.

Reference is next made to FIG. 4, which shows an embodiment of a security infrastructure 400. The security infrastructure 400 is configured in the networking layer 120 (FIG. 1) and provides security functions including, inbound Internet access, firewalling, security, remote access, spam prevention and virus filtering control systems for the business data continuity system 100 (FIG. 1). According to an embodiment, the security infrastructure 400 comprises a public network layer 410, a security layer infrastructure 420, and an authentication infrastructure 430. According to an embodiment, the public network layer 410 is implemented or configured using Cisco™ brand or equivalent hardware based router devices. The security layer infrastructure 420 is implemented or configured using a Cisco™ brand or equivalent hardware based Intrusion Detection, Spam Filtering and Virus Control devices. According to an embodiment, the authentication infrastructure 430 is implemented or configured using a Cisco™ or equivalent hardware and software based authentication server which is able to communicate with a Microsoft Active Directory RADIUS™ server or equivalent.

In operation, the security infrastructure 400 provides multiple levels of hardware-based security, and comprises a rules-based hardware configuration for filtering and authenticating all inbound traffic into the data continuity system 100. According to an embodiment, all inbound and outbound traffic that comes via the Internet 20 or from an internal network 500 (FIG. 5) pass through the security hardware and the rules are applied to pass or block the traffic.

Referring again to FIG. 4, the public network infrastructure layer 410 is intended for inbound and outbound traffic over the Internet 20. The public network infrastructure layer 410 is configured to accept all inbound packets into the data continuity system 100 and to transmit all packets out of the data continuity system 100. According to an embodiment, the public network infrastructure layer 410 is implemented in the form of a router system comprising routing tables for the Internet domains and is configured to define where traffic should be transmitted. According to a further aspect, the public network infrastructure layer 410 is implemented in a fault tolerant configuration and provides a failover to a second device without any interruption of service and controls a secondary backup Internet connection for handling the traffic.

As depicted in FIG. 4, traffic from the public network infrastructure layer 410 is passed or handled by the security layer infrastructure 420. The security layer infrastructure 420 is configured to provide border control and security filtering. According to an embodiment, the security layer infrastructure 420 determines traffic to be allowed to pass through into the data continuity system 100 and traffic to be blocked or discarded from passing through to the data continuity system 100, based on one or more rule settings. According to an embodiment, the security layer infrastructure 420 is implemented in the form of a "Router" or "Firewall" device and is configured to provide intrusion detection controls, spam management and filtering, and virus containment and elimination functions. According to another aspect, the security layer infrastructure 420 is implemented in a redundant configuration to provide failover to a secondary standby system with no interruption. Once the traffic has been reviewed and allowed to pass by the security layer infrastructure 420, it is passed to the authentication infrastructure layer 430.

The authentication infrastructure layer 430 is configured to pass or route the traffic from the security layer infrastructure 420 based on a set of rules to a resource or module in the data continuity system 100 via the internal network 150 (FIG. 1). (The internal network 150 according to an embodiment is described in more detail below with reference to FIG. 5.) The authentication infrastructure layer 430 may be implemented in both software and hardware. According to an embodiment, the authentication infrastructure layer 430 is configured to function in conjunction with the security layer infrastructure 420 to control a network within the internal network 150 for the traffic through a virtual network configuration table, i.e. VLAN's. According to another aspect, the authentication infrastructure layer 430 is configured to function as an "authentication server" for remote access to the virtual machine (VM) servers 620, which are described in more detail below with reference to FIG. 6.

According to another aspect, the authentication infrastructure layer 430 functions as a gateway between the security layer infrastructure 420 and the network definition 750 (FIG. 7) which runs on the control platform 700 (FIG. 7) as described in more detail below. According to an embodiment, the authentication infrastructure layer 430 is configured to process remote users based on their current and active credentials which are stored on the control platform 700 (FIG. 7), the network definitions module 750 (FIG. 7), and the software application components 180 (FIG. 1). The authentication infrastructure layer 430 is configured to manage communication between the above components and authenticates the communication to ensure that it is valid and appropriate, and then authorizes the security layer infrastructure 420 to provide access to the appropriate client private network in the internal network 150 in the data continuity system 100.

Figure 5:
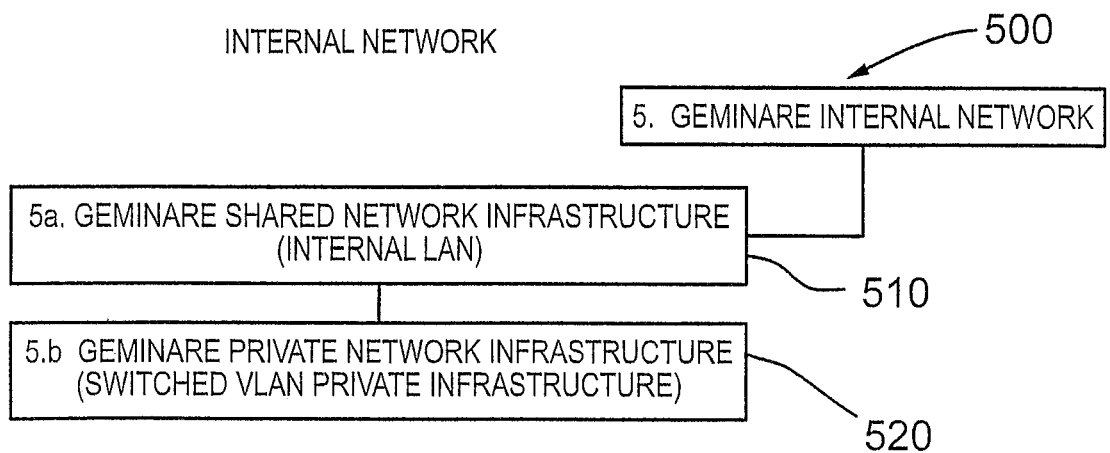
FIG. 5 shows in block diagram form an internal network structure for the data continuity system of FIG. 1 according to an embodiment of the invention.

Reference is next made to FIG. 5, which shows the internal network or infrastructure 150 according to an embodiment of the invention. The internal network is indicated by reference 500 in FIG. 5 and according to an embodiment comprises a shared network infrastructure 510 and a private network infrastructure 520. According to an embodiment, the shared network infrastructure 510 is implemented using a network layer 2 switch configuration. The private network infrastructure 520 is implemented using a network VLAN capable switch. The private network infrastructure 520 comprises a plurality of VLAN's and according to an embodiment, a private VLAN is configured for each client. In operation, the internal network 500, and the private VLAN's provide the capability for a multitude of clients to run on the shared hardware infrastructure 140 (FIG. 1) and the networking infrastructure 120 (FIG. 1), while maintaining complete security and separation between each client.

According to another aspect, the internal network 150 includes a management network. The management network runs on the same infrastructure and is configured to provide the data continuity system 100 with access and the capability to interact with each of the client networks and servers directly from a centralized location. According to an embodiment, the management network is configured as a VLAN and provides communication with each of the client VLAN's 520. However, to ensure security, each of the VLAN's cannot communicate directly with the management VLAN.

Figure 6:
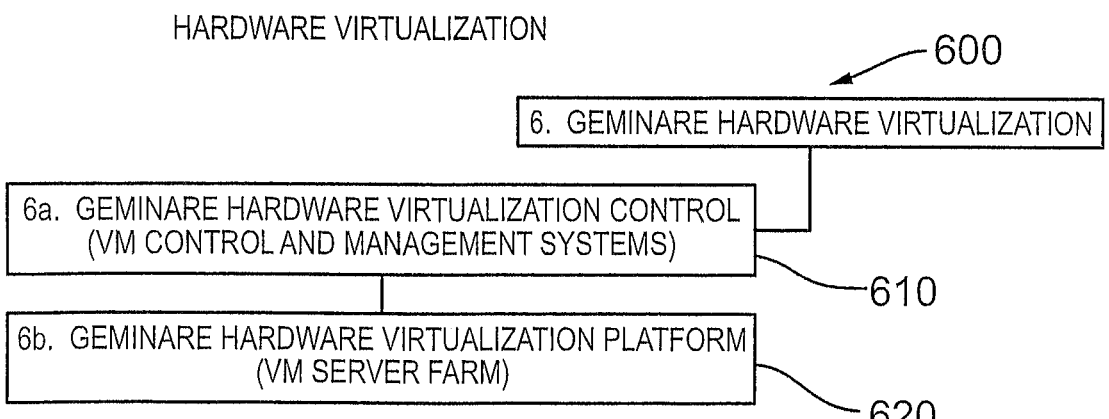
FIG. 6 shows in block diagram form a hardware virtualization structure for the data continuity system of FIG. 1 according to an embodiment of the invention.

Reference is next made to FIG. 6, which shows a hardware virtualization layer 600 according to an embodiment of the invention. The hardware virtualization layer 600 resides within the hardware infrastructure 140 (FIG. 1) of the system 100 and is configured according to an embodiment to provide the functionality to run a very large number of client environments and servers within virtualized instances. According to an embodiment, the hardware virtualization layer 600 is configured to provide multiple levels of redundancy and flexibility when deploying or modifying client servers or networks.

According to an embodiment and as depicted in FIG. 6, the hardware virtualization layer 600 comprises a hardware virtualization control 610 and a hardware virtualization platform 620. The hardware virtualization control 610 is configured to manage the client environments within a virtualized structure. According to an embodiment, the hardware virtualization layer 600 is configured to perform disk assignment and usage, networking assignment and management, and resource allocation, such as memory, CPU and other allocations.

According to an embodiment, the hardware virtualization control 610 is configured to manage allocation of resources in the hardware virtualization platform 620. The resources for allocation include disk storage, memory and CPU and has a direct relation to the control of the virtualized environment instances. According to an embodiment, the hardware virtualization platform 620 is configured to have direct control over the hardware resources such as disk, memory and CPU (without much regard for the configuration of them), i.e. the hardware virtualization platform 620 comprises the responsible mechanism in the data continuity system 100 for communicating with the hardware layer.

According to an embodiment, the hardware virtualization control 610 is implemented with IBM xSeries Servers and a VMWare Virtual Center, or any hardware platform capable of natively supporting virtualized instances and corresponding software or platform designed to run a mass number of virtual machines (VM's) on a single device (i.e. "one physical box"). According to an embodiment, the hardware virtualization platform 620 is implemented using IBM xSeries Servers and VMWare ESX Server Software. According to an embodiment, the hardware virtualization layer 600 is configured to support approximately 4000 clients configured with hardware resources. The particular implementation details will be within the understanding of one skilled in the art.

Figure 7:
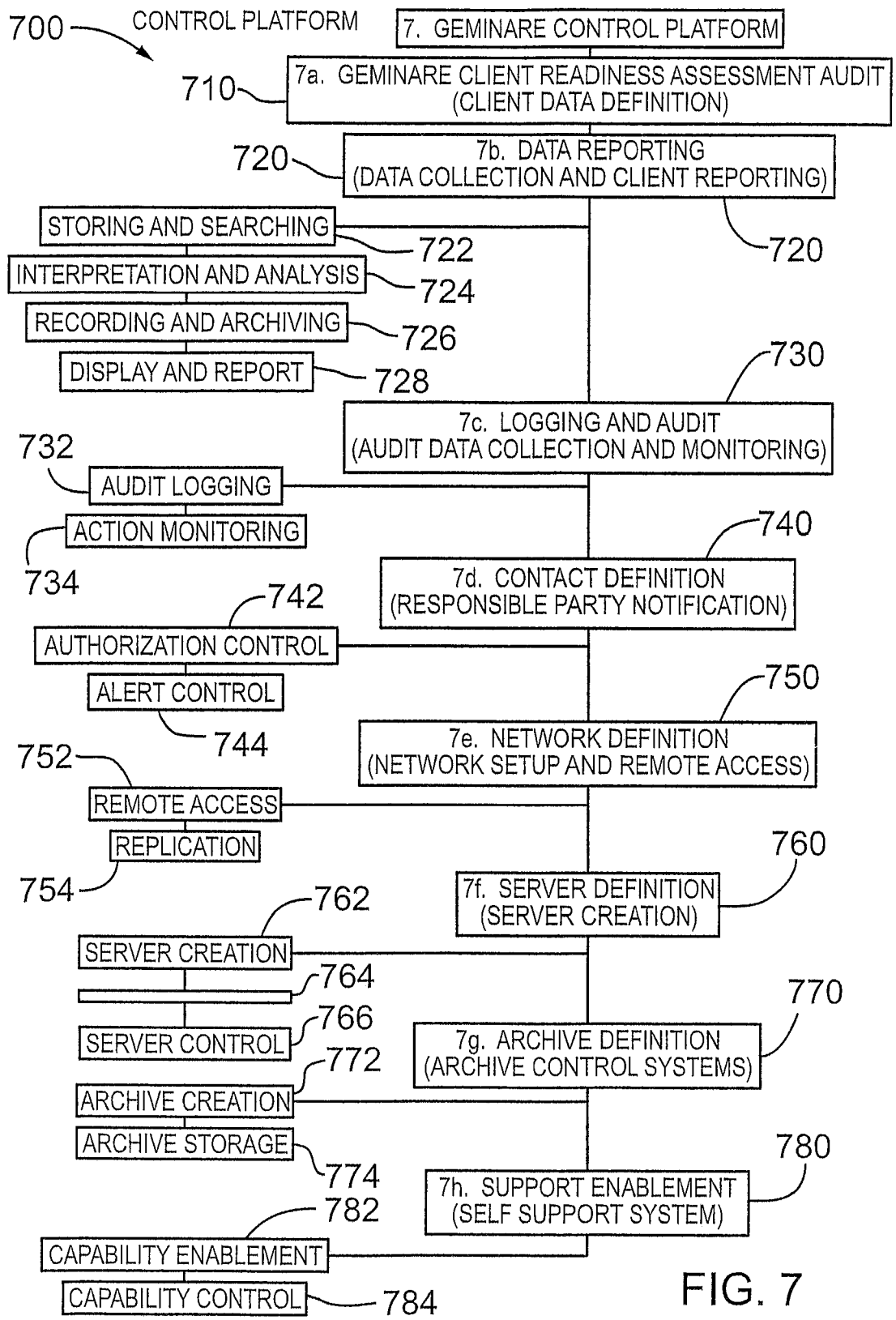
FIG. 7 shows in block diagram form a control platform for the data continuity system of FIG. 1 according to an embodiment of the invention.
Figure 8:
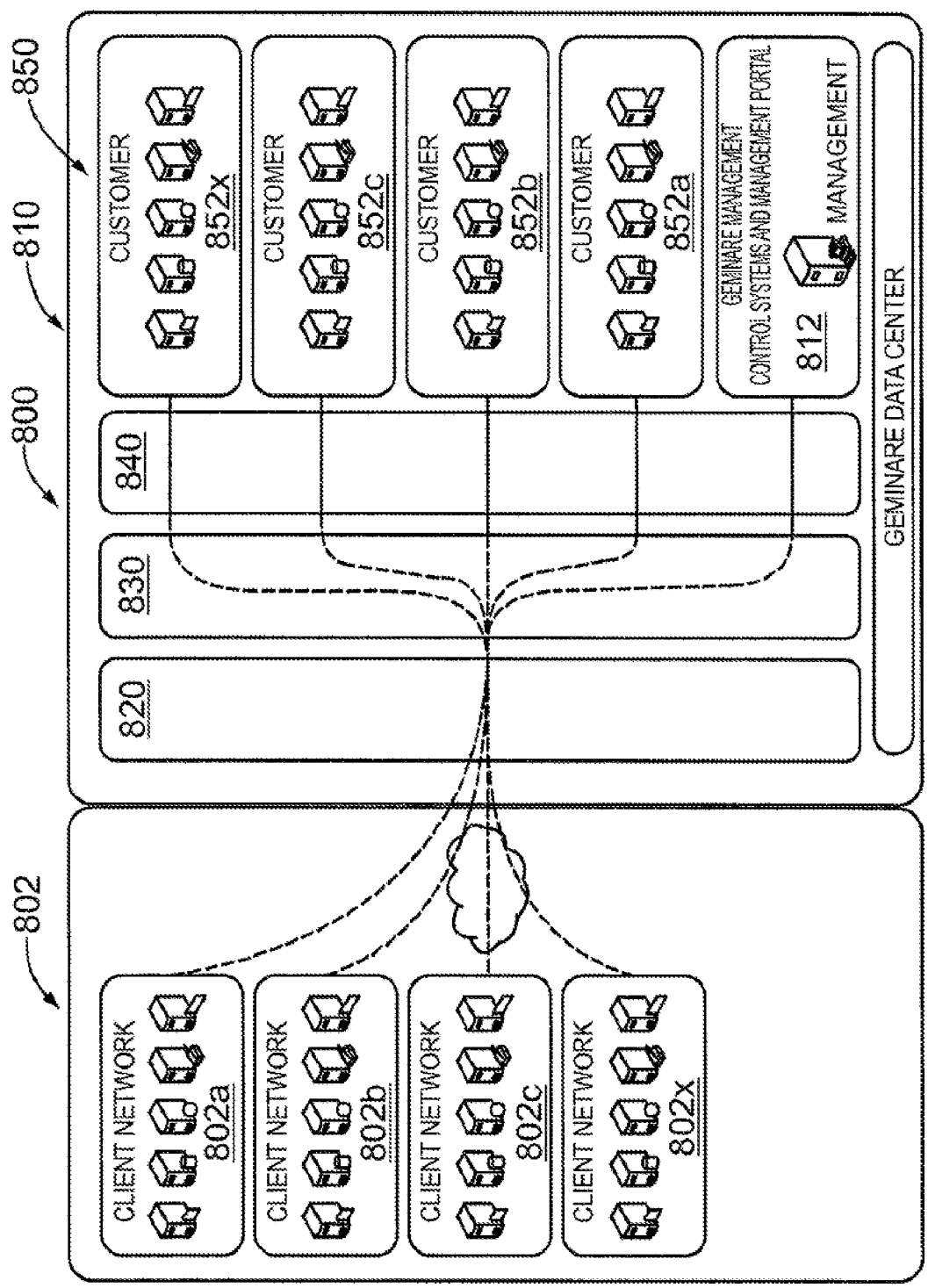
FIG. 8 shows in diagrammatic form a system for maintaining business data continuity and a control system and management portal according to an embodiment of the present invention and in the context of an exemplary operating environment.

Reference is next made to FIG. 7, which shows a control platform according to an embodiment of the invention and indicated generally by reference 700. As will be described in more detail below, the control platform 700 is configured according to an embodiment to provide the following functions for the data continuity system 100: an interface function, a definition function, a control function, a reporting function, a logging function and an alerting function. According to an embodiment, the control platform 700 provides an interface for clients and the capability to directly call hardware and software components within the data continuity system 100 based on user requests. According to another embodiment, the control platform 700 includes a rules-based mechanism, which allows a user to configure a data continuity process by performing a "Readiness Assessment" survey or audit.

The functionality and features associated with the control platform 700 are summarized in Table I as shown below:

TABLE I

| Control Platform Entrance | Portal Server Website | | | | | | |
|---|---|---|---|---|---|---|---|
| Data Collection Point | Client Audit/Readiness Assessment (710) | | | | | | |
| Primacy Management Sections | Reporting (720) | Logging (730) | Contact Definition (740) | Network Definition (750) | Server Definition (760) | Archive Definition (770) | Support Enablement (780) |
| Section Capability #1 | Storing/ Searching (722) | Audit Logging (732) | Authentication Control (742) | Remote Access (752) | Server Creation (762) | Archive Creation (772) | Capability Enablement (782) |
| Section Capability #2 | Interpretation (724) | Action Monitor (734) | Alert Control (744) | Replication (754) | Server Validation (764) | Archive Storage (774) | Capability Control (784) |
| Section Capability #3 | Recording (726) | | | | Server Control (766) | | |
| Section Capability #4 | Display (728) | | | | | | |

References in Table I correspond to references or like elements in FIG. 7.

As shown in FIG. 7, the control platform 700 comprises the following modules; a client readiness assessment audit module 710, a data reporting module 720, a logging and audit module 730, a contact definition module 740, a network definition module 750, a server definition module 760, an archive definition module 770, and a support enablement module 780. According to an embodiment, aspects of the control platform 700 are implemented and configured in the form of a user interface which is accessed via the portal 170 (FIG. 1).

According to an embodiment, the client audit and readiness assessment module 710 is configured as an online tool that collects client server and network information using, for example, an interactive survey form or questionnaire which is presented to the user via the portal 170. The control platform 700 includes one or more processes that process the collected data and generate a server and network configuration for the user. According to an embodiment, the client audit and readiness assessment is accessed through a web browser (e.g. MS Internet Explorer) online at the portal 170.

The data reporting module 720 is configured for data collection and client reporting. According to an embodiment, the data reporting module 720 comprises a storing and searching engine 722, an interpretation and analysis engine 724, a recording and archiving engine 726, and a display and report engine 728.

The storing and searching engine 722 is configured to provide live or instantaneous feedback on the status of the replication data for a client within the data continuity system 100, for example, via the interface in the portal 170 (FIG. 1). According to another aspect, the storing and searching engine 722 is configured to allow a user to search both current and historical data, i.e. data that has been processed over time, for example, replicated data for MS Exchange server over the past 12 hours is 12345 GB.

The interpretation and analysis engine 724 is configured with a set of intelligent business rules that are designed to interpret the replication data that has been stored, i.e. archived, and report back the status of the data to the end user client. According to an embodiment, the interpretation and analysis engine 724 is configured to interpret the business rules through calculations that are designed to compare the data that is on the primary client server(s) 14 (FIG. 1) with the replication servers running on the hardware virtualization layer 140 (FIG. 1). An exemplary report may comprise: "MS Exchange server is OK and 100% in sync with the primary server".

The recording and archiving engine 726 is configured to record the results generated by the interpretation and analysis engine 724, which can be very important for clients and companies that require documented validations that the services were functioning properly at specific periods of time. According to an embodiment, the recording and archiving engine 726 is responsive to a request through the storing and searching engine 722. An exemplary data output from recording and archiving engine 726 may comprise: "MS Exchange server is OK and 100% in sync on Dec. 31, 2007 with the primary server".

The display and report engine 728 is configured to provide an immediate visual representation to the client about the status of their replication servers. According to an embodiment, the display engine 728 is responsive to the interpretation engine 724 and displays a green, yellow or red indicator for each replica server. For example, a green indicator, e.g. a "green light" indicates that the replica server for the MS Exchange server is in sync with the client production server 14 (FIG. 1).

The logging and audit module 730 is configured for audit data collection and monitoring. According to an embodiment, the logging and audit module 730 comprises an audit logging engine 732 and an action monitoring engine 734.

The audit logging engine 732 is configured to log and record all actions with the portal 170 for the data continuity system 100. It will be appreciated that this provides a SaaS (Software as a Service) 70 Type II compliant system process. According to an aspect, the logged data/actions includes changes to contact data, server data, control systems and audits. Exemplary data generated by the audit logging engine 732 may take the following form: "Administrator Geminare Admin, logged into this account on Jan. 15, 2008 at 3:33 pm and updated the address information".

The action monitoring engine 734 is configured to provide a SaaS 70 Type II compliant system and documentation concerning the state of the server systems in the hardware virtualization platform 620 (FIG. 6) at specific times. According to an embodiment, all changes of server states are monitored and recorded in an action log. According to another aspect, the action monitoring engine 734 is configured to provide intelligent processing of the server state information in order to inform the users of the server and any corrective action which should be taken. Exemplary data generated by the action monitoring engine 734 may take the following form: "MS Exchange server state was changed from Paused to Replicating at 3:34 pm on Jan. 13, 2008 by Geminare Admin user".

The contact definition module 740 is configured to provide notification to the responsible parties. According to an embodiment, the contact definition module 740 comprises an authorization control engine 742 and an alert control engine 744.

According to an embodiment, the authorization control engine 742 is configured to capture data for users that have access and/or authorization to control and/or manage the replication servers 620 (FIG. 6). This provides a mechanism to ensure that only authorized users have the ability to manipulate the control states of the server systems. Exemplary data generated by the authorization control engine 742 may take the following form: "Administrator #1 has access to MS Exchange server start and stop status".

According to an embodiment, the alert control engine 744 is configured to work in conjunction with the authorization control engine 742 to provide the data continuity system 100 with the capability to alert and notify the appropriate users of system state changes. Exemplary data generated by the alert control engine 744 may take the following form: "Administrator #1 is accessible at geminareadmin@geminare.org and via SMS at 416-555-1212".

The network definition module 750 is configured to provide network setup and remote access functions. According to an embodiment, the network definition module 750 comprises a remote access engine 752 and a server control engine 754.

According to an embodiment, the remote access engine 752 is configured to connect the client network 16 (FIG. 1) to the data continuity system 100 in order to provide remote access. The required controls, access information, authentication and setup are defined according to the client readiness assessment audit 710 (as described above) and utilized by the remote access engine 752 to configure the connection. Exemplary connection data includes IPSec IP, Encryption Key and Layer information.

According to an embodiment, the replication engine 754 is configured to replicate active data from the connected client network 16 (FIG. 1) to the replication server(s) in the hardware layer 140 (FIG. 1), for example, in real-time utilizing block level replication techniques. According to an embodiment, the replication parameters are defined in the network definitions module 750 and comprise compression types, timing and locations, for example, "2:1 Compression", "Transfer data only after 9 pm" and "Transfer to location c:/spool".

The server definition module 760 is configured to define, i.e. create, replication servers on the hardware virtualization platform 620 (FIG. 6) in the hardware infrastructure 140 (FIG. 1) according to a server definition. The replication server(s) are configured to replicate or mirror corresponding servers 14 on the client system 10 (FIG. 1). According to an embodiment, the server definition module 760 comprises a server creation engine 762, a server validation engine 764, and a server control engine 766.

According to an embodiment, the server creation engine 762 is configured to create replication server(s) on the hardware virtualization platform 620, based on a server definition that is created or generated by the client readiness assessment audit 710 (FIG. 7) as described above. An exemplary server definition generated by the client readiness assessment audit 710 may take the following form: "MS Exchange running 2003, on a Windows 2003 Server with 5 GB of RAM, 2x 50 GB hard drives".

According to an embodiment, the server validation engine 764 is configured to take the information that was entered in the server definition module 760 (server creation engine 762) and process the information through one or more defined setup rules. The operation of the server validation engine 764 serves to ensure that a valid and appropriate server creation is performed for the hardware virtualization platform 620. According to an embodiment, the server validation engine 764 looks for matching server configuration, version and setup information with predefined configuration data to ensure a match is made within reasonable variations.

According to an embodiment, the server control engine 766 sets up a control system for each of the replication servers after the server creation (762) and server validation (764) operations are performed. According to an embodiment, the control system is configured to allow the replication process to be paused, started, stopped, imaged, rebuilt, run in a failover state, failed back, etc. It will be appreciated that the control system provides a mechanism for a client to control their system after creation. An exemplary control system configuration comprises: MS Exchange server is setup to Pause, Replication or Failover state.

The archive definition module 770 is configured to provide a mechanism for defining archive control systems. According to an embodiment, the archive definition module 770 comprises an archive creation engine 772 and an archive storage engine 774.

According to an embodiment, the archive creation engine 772 is configured to generate an archive process to automatically archive data out of the active system (i.e. replication servers) to an archive system. The archive process is based on the archive definition, which according to an embodiment is based on data entered and/or generated by the client readiness assessment audit module 710 (described above). According to an embodiment, the archive process defines an information level and time-line at which data should be archived which is balanced or factored against the data management capability of the system. An exemplary archive process comprises all data on MS Exchange server 001 to be archived to database backup if older than 30 days.

According to an embodiment, the archive storage engine 774 is configured to define a retention and control policy or process for the archived data. According to an embodiment, the retention and control policy is based on information from the client readiness assessment audit module 710 and defines how long the archived data should be kept and how much data should be kept. According to an embodiment, the portal 170 (FIG. 1) includes a component configured to allow a user to directly retrieve data from archive storage.

The support enablement module 780 is configured to provide a self support system for a client. According to an embodiment, once the server data and preferences have been entered through the client readiness assessment audit module 710, the support enablement module 780 is configured to provide a support platform for client users to test and troubleshoot their configured system on the data continuity system 100. According to an embodiment, the support enablement module 780 comprises a capability enablement engine 782 and a capability control engine 784.

According to an embodiment, the capability enablement engine 782 is configured to allow an administrator to define the level of and access to built-in tools for each user account. An exemplary definition for user self-support comprises: user is able to test and see if the VPN network is connected by sending ICMP packets through a VPN tunnel to the replication servers on the data continuity system 100 as defined in the readiness assessment network definition.

According to an embodiment, the capability control engine 784 is configured to allow a user to perform their own tests unassisted through the portal interface 170 (FIG. 1). The tests as defined by the capability enablement engine 782 can range from VPN based tests, to services tests and network responses. According to an aspect, the tests can be anything from VPN, services or network responses and are executed in real-time based on the definition in the capability enablement engine 782.

The software application components module or layer is indicated by reference 180 in FIG. 1 and according to an embodiment of the invention comprises the applications that run directly on the virtualized server instances in the hardware virtualization platform 620 (FIG. 6). The application components typically comprise mail server applications, database server applications, file server applications and/or directory servers. Exemplary application components include Microsoft Exchange server, Microsoft SQL server and Microsoft IIS server. According to another aspect, the software application components module 180 is configured to process incoming data once it has passed through all the security and operational layers in the data continuity system 100, i.e. data that has been replicated through the data continuity system 100, as described above. According to another aspect, the application components represent the actual server applications that are processing the data for the users and are typically responsible for distributing the data as well. According to another aspect, the hardware virtualization platform 620 (FIG. 6) is configured to run multiple instances of the application component(s). According to an embodiment, the data continuity system 100 does not replicate the application layer within the server environment only the data that this layer uses and as such the software application components layer 180 is utilized in the delivery of the information from the client servers 14 (FIG. 1) and the replication servers 620 (FIG. 6) in the hardware infrastructure layer 140 (FIG. 1). According to another embodiment, the application components module 180 includes a data replication engine 182 or an application failover control engine 184 in order to provide the capability to "swap out" a replication engine.

The archive components module is indicated by reference 190 in FIG. 1 and according to an embodiment is configured to archive data from the data continuity system 100 to a separate system (not shown). For example, once data has been collected, processed (e.g. replicated) and utilized within the data continuity system 100, it may need to be archived out into a separate system, for example, based on criteria that are defined according to the client readiness assessment audit module 710 (FIG. 7) as described above. According to an embodiment, the archive components module 190 comprises a hardware and software platform that is responsible for directly archiving data out of the live system into a separate hardware platform for long term storage. According to an embodiment, the archive component module 190 is implemented with a hardware component utilizing a SAN™ storage device, or other type of shared storage environment hardware device or platform, and a software component comprising ArcServe™ archiving software or other type of backup/archiving software solution. According to an embodiment, the archive module 190 is enabled for duplication and backup of the entire existing environment configured for the user, or enabled for duplication or copying of just the data within the environment for archival purposes. According to another aspect, the archive module 190 is configured to copy data in a live and "hot" state from one physical system to the next for an "internal" high availability capability. It will be appreciated that by providing the capability to image an entire environment configured for a user (and duplicate it in real-time), the data continuity system 100 is able to create exact archival and compliant duplicates of client environments in a secure and auditable environment. According to another aspect, the archive process can be audited and/or managed via the portal interface 170 (FIG. 1). According to another embodiment, the archive process can be audited and/or managed via the portal interface 170 (FIG. 1).

Reference is next made to FIGS. 8 to 14, which show a system according to an embodiment of the present invention configured for a multi-tenant, multi-instant management platform. The system is indicated generally by reference 810 in FIG. 8. The system 810 comprises a control system and management portal 812, and a networking layer 820, a hardware layer 830, and a software layer 840 implemented for example as described above. The system 810 interfaces to one or more client networks 802, indicated individually by references 802a, 802b, 802c . . . 802x, through the networking layer 820. The client networks 802 may comprise individual clients or subscribers of the services of the system 810 and/or clients or customers of an entity or partner that provides/administers the services of the system 810. For example, the client network 802a may comprise an individual client or customer, whereas the client networks 802b and 802c comprise the customers of a partner associated with the system 810. According to an embodiment, the control system and management portal 812 is configured to allow unlimited number of partners to manage an unlimited number of client networks 802 (e.g. customers) at the same time without having any impact on each other. According to one aspect, a corresponding client network 852 (e.g. "hosted version"), indicated individually by references 852a,852b, 852c . . . 852x(linked through the networking layer 820) is created and an API interface is added/configured into the control and management portal 810. The configuration allows partners or entities to view/manage their respective client/customer installations privately at the same time (for example, based on the security layers and mechanisms described above), for example, from a single screen, as will be described in more detail below.

Figure 9:
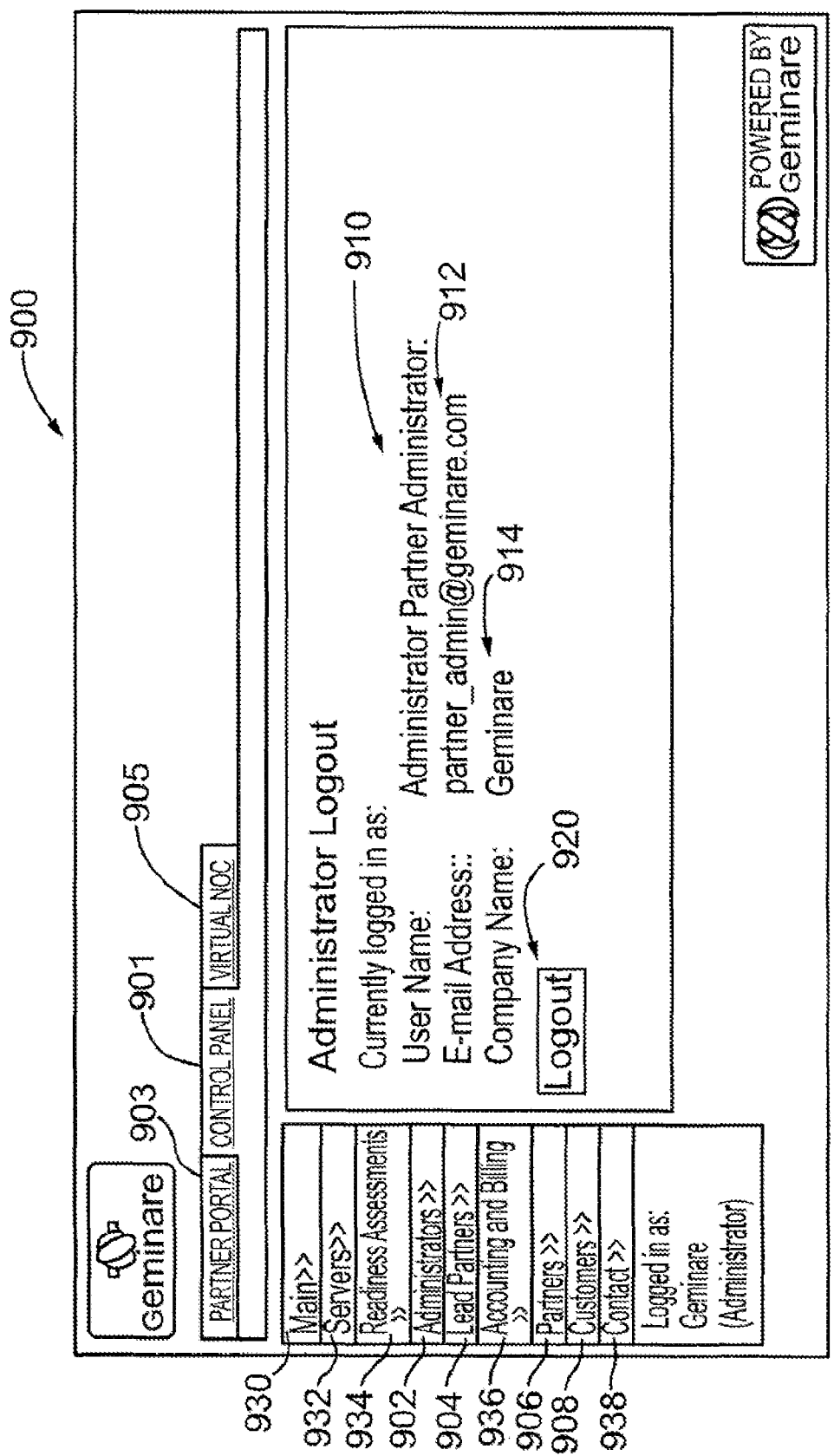
FIG. 9 is a screen shot of a portal log-in window or screen for the control system and management portal of FIG. 8 according to an embodiment of the present invention.

Reference is next made to FIG. 9, which is a screen shot of a login administrator screen indicated generally by reference 900. The login screen 900 is accessed from a Control Panel tab or link 901. According to an embodiment, the login screen 900 is configured to recognize user access and configure the access controls according to the privileges, credentials, security and/or actions assigned or authorized for the particular user. For example. the login screen 900 is configured to recognize "Administrators" 902, "Lead Partners" 904, "Partners" 906 and "Customers" 908. For the exemplary login depicted in FIG. 9, the login screen 900 is configured for an administrator login, and the administrator is identified by a User Name field 910, an E-Mail Address field 912 and a Company Name field 914, and a Logout button 920.

As shown in FIG. 9, the user interface for the login 900 and the other screen include other common or configurable menu items, such as a Main screen link 930, a Servers screen link 932, a Readiness Assessments screen link 934, an Accounting and Billing screen link 936 and a Contact screen link 938. The user interface also includes a Partner Portal tab 903 and a Virtual NOC tab 905 as shown in FIG. 9.

Figure 10:
FIG. 10 is a screen shot of a search and management window or screen for the control system and management portal of FIG. 8 according to an embodiment of the invention.

Reference is next made top FIG. 10, which is a screen shot of a Partner Search screen indicated generally by reference 1000. The Partner Search screen 1000 is configured for searching partners (e.g. active partners or other similar entities) on the system 800. The search controls/parameters include "From" and "To" fields 1010, a "Company Name" field 1012, a "Last Name" field 1014, a "First Name" field 1016 and an "Email"field 1018. According to an embodiment, the search results are displayed in a "Search Results" window indicated generally by reference 1020. According to another aspect, each of the search partners is displayed with an active "Manage" button or control 1030. According to an embodiment the Manage button 1030 is configured to allow an entity, for example, an administrator with the required privileges, to impersonate the selected partner.

Figure 11:
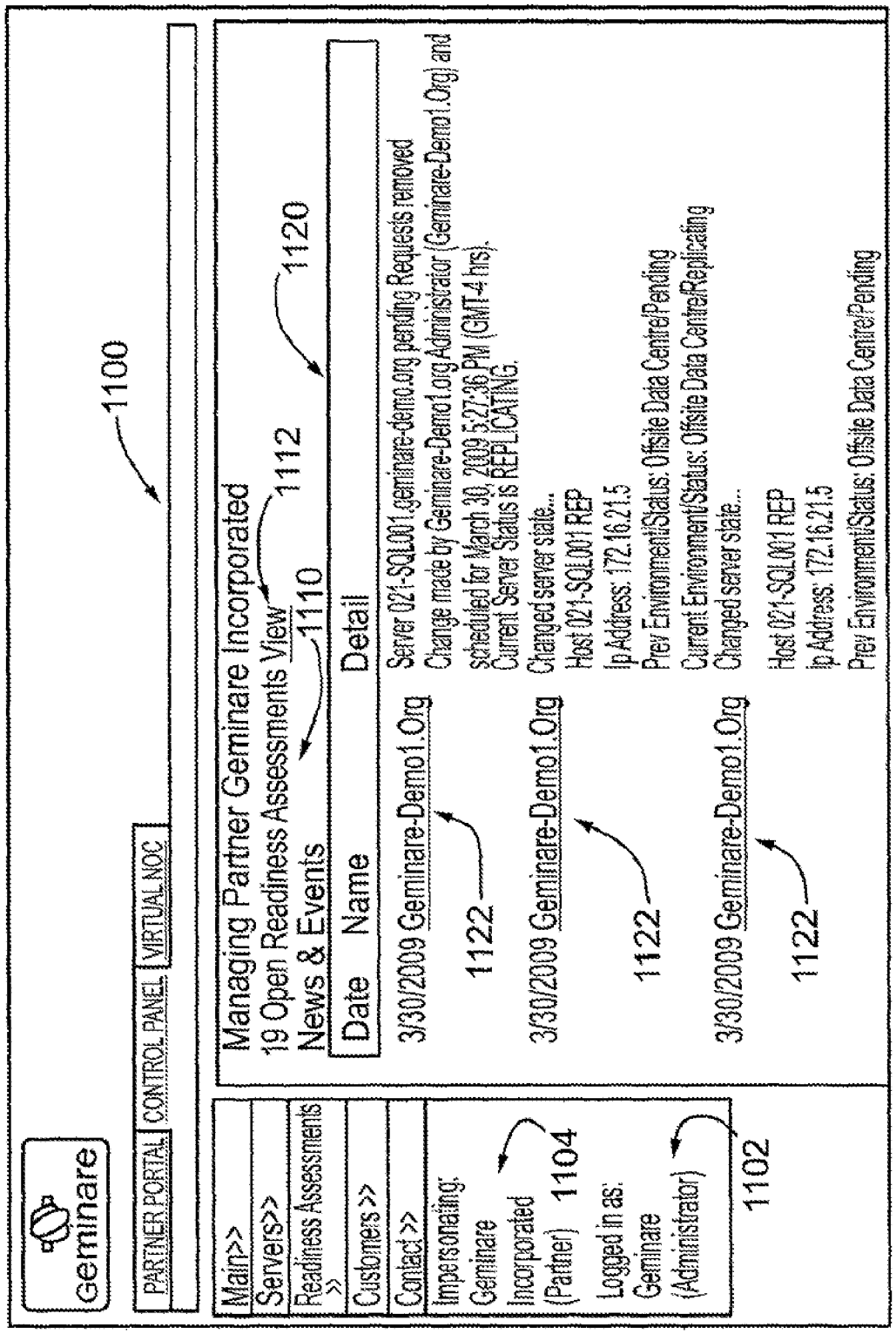
FIG. 11 is a screen shot of a screen configured for managing/controlling a customer or client associated with an entity configured in the control system and management portal of FIG. 8 according to an embodiment of the present invention.

Reference is next made to FIG. 11, which is a screen shot of an exemplary Manage Partner screen indicated generally by reference 1100. In accordance with this example, the administrator is logged-in (as indicated by reference 1102) and is configured to impersonate a Partner, e.g. "Geminare Incorporated", (as indicated by reference 1104). According to an embodiment, the Manage Partner screen 1100 is configured with an "Open Readiness Assessments" field 1110 and a "View" button 1112 for viewing the open readiness assessments. According to an embodiment, the Manage Partner screen 1100 includes a "News & Events" window 1120 which is configured to display events associated with the partner. The control system 810 is configured to display/provide access to data associated with the selected partner (e.g. the partner being impersonated in this example). According to another aspect, active fields or buttons indicated generally by reference 1122 are provided and configured to display additional information or details associated with an event.

Figure 12:
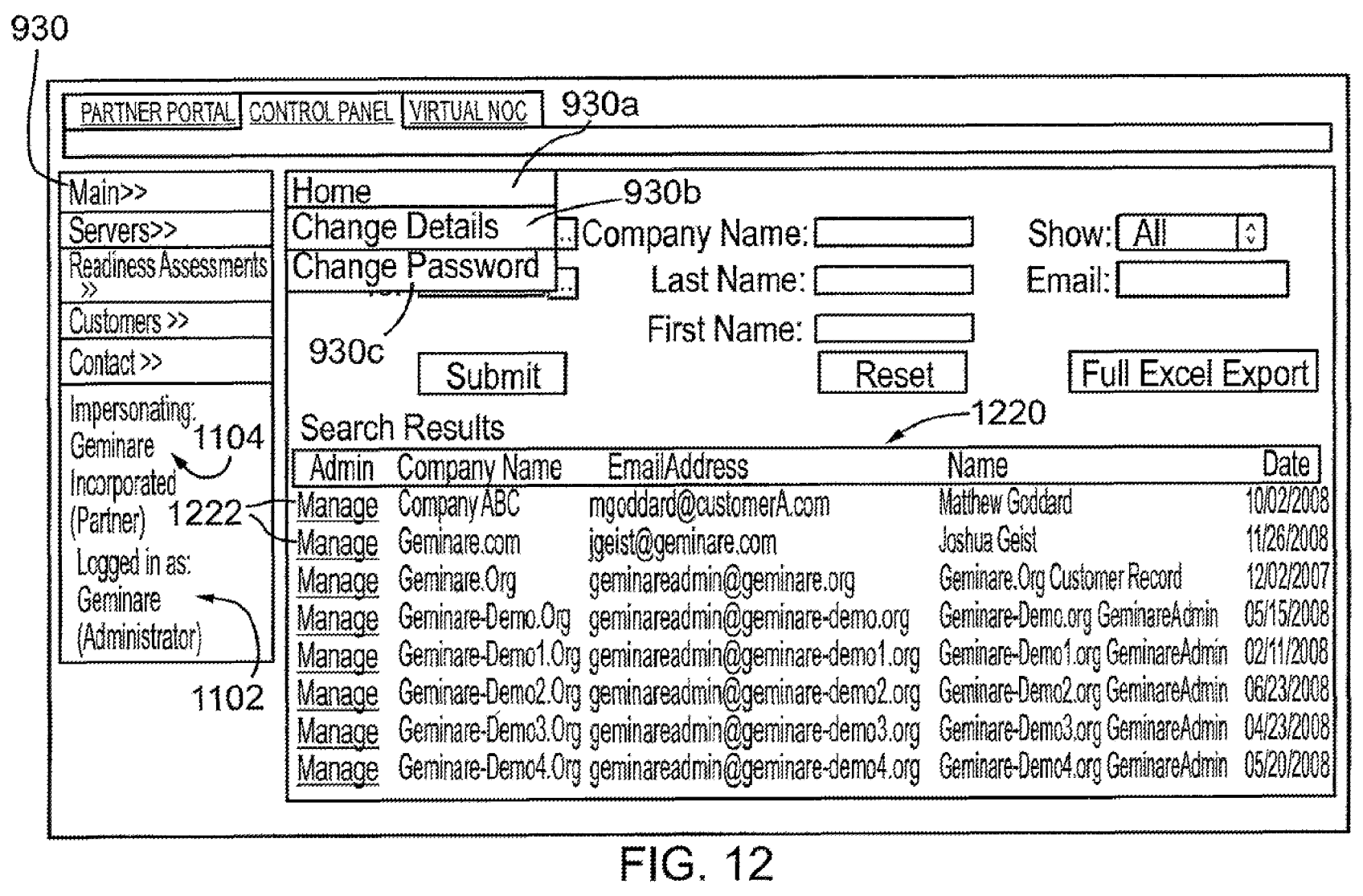

Reference is next made to FIG. 12, which is a screen shot of an exemplary Partner Search screen and is indicated generally by reference 1200. The Partner Search screen 1200 includes a search results window 1220 (for example, corresponding to 1020 in FIG. 10 as described above). The Partner Search screen 1200 is configured to allow a partner to search and access its entire client or customer base. As shown, the search results window 1220 is configured with a display showing a listing of the clients or customers (e.g. client networks) associated with the Partner. As shown in FIG. 12, each of the listings includes an active "Manage" button 1222. This allows the partner to control the configuration and/or settings for each of the clients. As also depicted in FIG. 12, the Main menu button 930 has been activated and is configured with a Home button 930a, a Change Details button 930b and a Change Password button 930c. The state of the partner (e.g. Geminare Incorporated) being impersonated by the administrator is indicated by the display boxes or fields 1102 and 1104.

Figure 13:
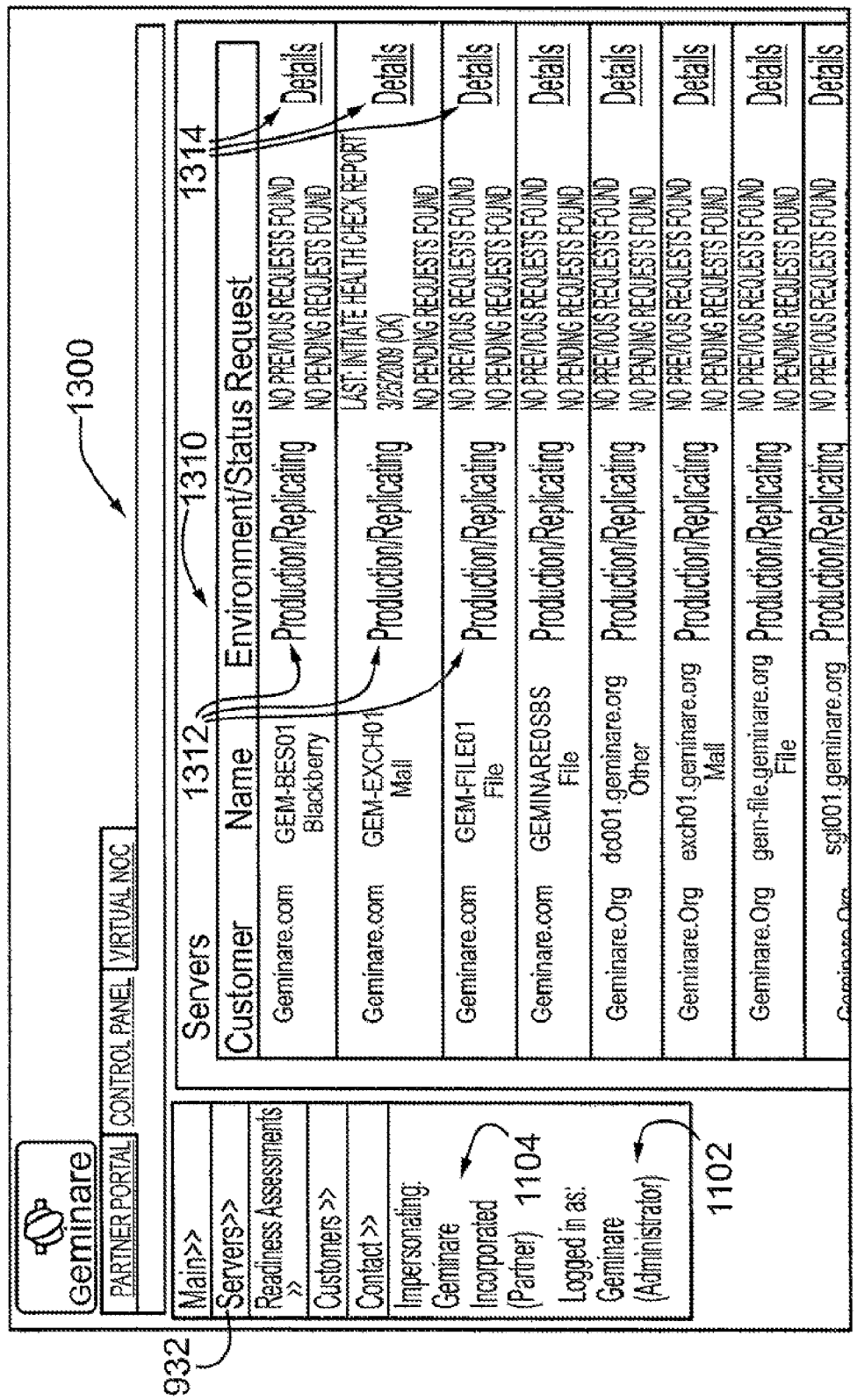
FIG. 13 is a screen shot of a screen configured for accessing and controlling clients or customers associated with an exemplary entity configured in the control system and management portal of FIG. 8 according to an embodiment of the invention.

Reference is next made to FIG. 13, which is a screen shot of a Server control screen indicated generally by reference 1300. The Server control screen 1300 is displayed in response to the Servers button 932 being clicked and provides a listing 1310 of the control systems (e.g. servers) for the customers associated with the partner. According to an embodiment, the Server control screen 1300 is configured with control buttons 1312, 1314 for accessing and/or controlling features and/or functions associated with the hardware/software (e.g. server) for a client or customer. According to this aspect, the Server control screen 1300 provides the capability for a partner (or an entity legitimately impersonating the partner) to access the control systems and functions across the entire customer base associated with the partner.

Figure 14:
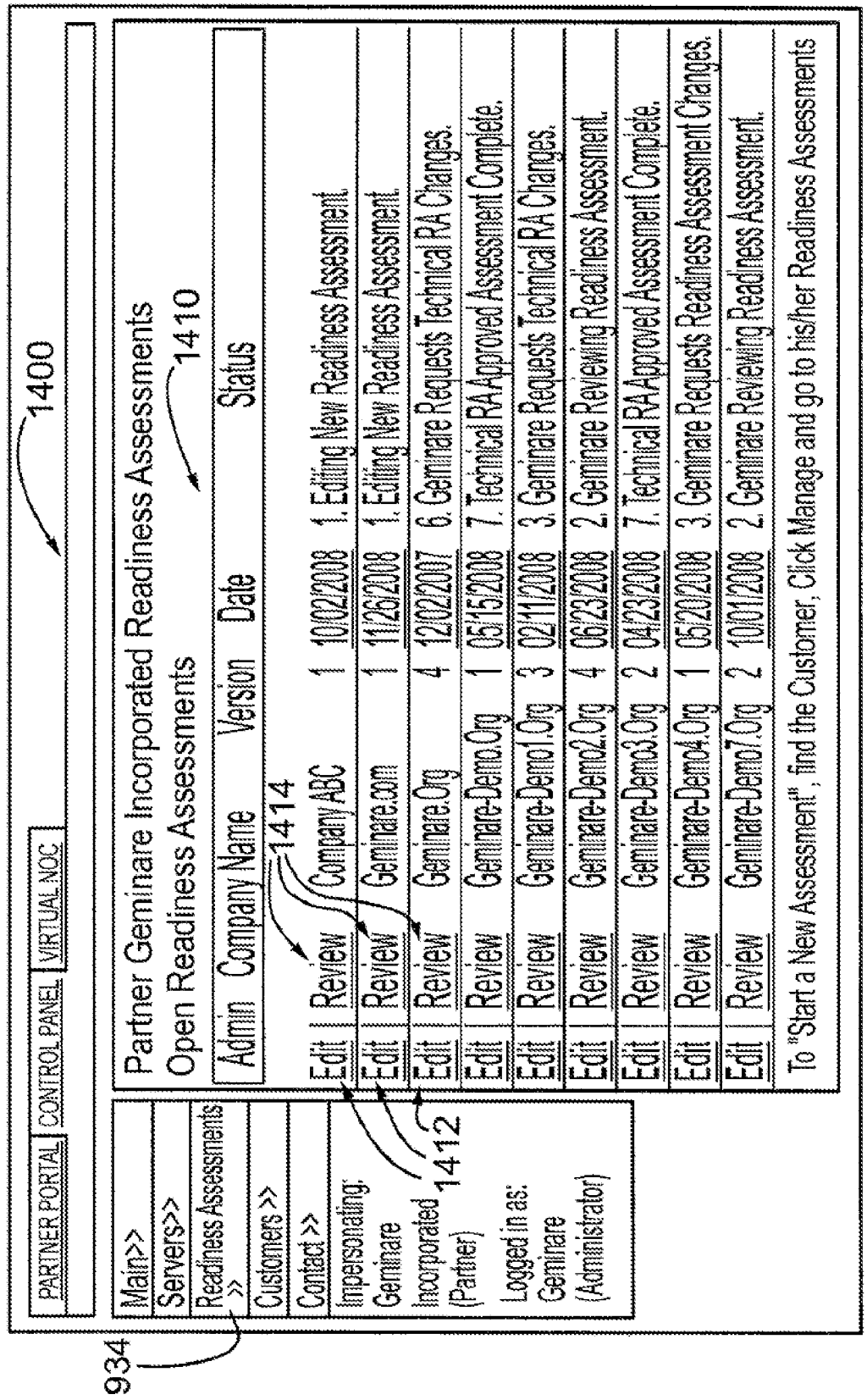
FIG. 14 is a screen shot of a screen configured for accessing and controlling the Readiness Assessment tool for the control system and management portal of FIG. 8 according to an embodiment of the invention.

Reference is next made to FIG. 14, which is a screen shot of a Readiness Assessments control screen indicated generally by reference 1400. The Readiness Assessments control screen 1400 is displayed in response to the Readiness Assessments button 932 being clicked and provides a listing 1410 of the readiness assessment for each of the customers associated with the partner. According to an embodiment, the Readiness Assessments control screen 1400 is configured with a respective Edit control button 1412 and a Review control button 1414. Using the Edit 1412 and Review 1414 control buttons, the partner (or Other authorized user) can access/control the functions associated with the readiness assessment tool for example as described above.

The functionality and features associated with the control system and management portal 810 (FIG. 8) and/or the user interface screens or windows (FIGS. 9 to 14) for the control system and management portal 810 as described above and in accordance with the embodiments may be implemented in the form of one or more software objects, components, or computer programs and program modules in the server and/or the client machines. Further, at least some or all of the software objects, components or modules can be hard-coded into processing units and/or read only memories or other non-volatile storage media in the mobile communication device, server and/or other components or modules depicted in the drawings. The specific implementation details of the software objects and/or program modules will be within the knowledge and understanding of one skilled in the art.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method comprising:
    hosting, by a first server of a continuity system network, a virtual server configured to receive a set of active data from a second server of a client computing network using a replication engine for the client computing network and replicate the set of active data;
    presenting, by a control platform of the continuity system network, a user interface to a client of the client computing network;
    configuring, by the first server according to a server definition process, the virtual server based on a rule of the control platform defined by a user entry in the user interface, the rule instructing the virtual server to run at least one application of the second server using the set of active data, wherein the user interface includes an online tool that collects client server and network information using a survey form presented to a user, wherein the server definition process is configured to create the virtual server on a virtualization platform based on a server definition generated according to one or more user entries into the survey form, and wherein the server definition process is configured to validate the virtual server created for the virtualization platform according to one or more setup rules for validating server creation; and
    controlling, by the control platform according to the server definition process, a failover to the virtual server from the second server based on the rule in response to a failover event, wherein the failover event corresponds to the second server.

2. The method of claim 1, wherein the virtual server is configured to operate independently of the second server.

3. The method of claim 1, wherein the virtual server is configured to asynchronously receive the set of active data from the second server.

4. The method of claim 1, wherein the user interface is presented via a virtual private network router.

5. The method of claim 1, wherein the virtual server is configured to receive the set of active data from a replication logic running on the second server.

6. The method of claim 1, wherein the set of active data includes a plurality of files in a plurality of application formats, wherein the application formats are different from each other.

7. The method of claim 1, wherein the user interface is a first user interface, wherein the client is a first client communicating on a first virtual local area network, wherein the virtual server is a first virtual server, wherein the user entry is a first user entry, wherein the failover event is a first failover event, and further comprising:
    hosting, by the first server, a second virtual server associated with a third server, wherein the first server hosts the first virtual server and the second virtual server simultaneously;
    presenting, by the control platform, a second user interface to a second client communicating on a second local area network, wherein the second input element is configured to receive a second user entry;
    configuring, by the first server, the second virtual server based on a second rule of the control platform defined by the second user entry in the second user interface; and
    controlling, by the control platform, a second failover to the second virtual server from the third server based on the second rule in response to a second failover event.

8. The method of claim 1, wherein the virtual server is configured based on calling a hardware component directly, wherein the second server includes the hardware component.

9. The method of claim 1, further comprising:
    generating, by the first server, a configuration for the second server based on the user entry, wherein the virtual server is configured based on the configuration.

10. The method of claim 1, further comprising:
    presenting, by the control platform, a status of the set of active data as replicated to the client.

11. The method of claim 1, wherein the user entry is a first user entry, wherein the user interface is configured to receive a second user entry, and the method further comprising:
    receiving, by the first server, the second user entry from the second input element;
    searching, by the first server, the set of active data as replicated based on the second user entry; and
    presenting, by the control platform, a result for the searching to the client via the user interface.

12. The method of claim 11, wherein the set of active data is searched over a predefined time period.

13. The method of claim 11, wherein the second user entry includes a data type, wherein the result is based on the data type.

14. The method of claim 1, further comprising:
interpreting, by the control platform, the set of active data as replicated and archived based on a second rule, wherein the user entry includes the second rule; and
presenting, by the control platform, a report to the user interface based on the interpreting.

15. The method of claim 14, wherein the set of active data is interpreted based comparing the set of active data as replicated with a set of data on the second server, wherein the set of active data is sourced from the set of data, wherein the report is informative of a degree of replication of the set of data.

16. The method of claim 14, further comprising:
stamping, by the first server, the report with a date stamp;
archiving, by the first server, the report with the date stamp; and
making, by the first server, the report with the date stamp searchable, wherein the report is presented based on the report with the date stamp being made searchable.

17. The method of claim 1, further comprising:
generating, by the control platform, a colored indicator of a status of the virtual server;
presenting, by the control platform, the colored indicator on the user interface.

18. The method of claim 1, further comprising:
creating, by the first server, a log entry based on the virtual server being configured based on the user entry.

19. The method of claim 1, further comprising:
writing, by the control platform, a state of the virtual server periodically into an action log.

20. The method of claim 19, further comprising:
performing, by the control platform, a reading of the action log;
identifying, by the control platform, a corrective action based on the reading;
generating, by the control platform, a message informative of the corrective action; and
presenting, by the control platform, the message to the client on the user interface.

21. The method of claim 1, wherein the user entry is a first user entry, wherein the user interface is configured to receive a second user entry including a set of symbols, and the method further comprising:
associating, by the control platform, a second rule with the set of symbols and the virtual server;
facilitating, by the control platform, a notification being sent based on the set of symbols responsive to the second rule being triggered on the first server.

22. The method of claim 1, wherein the virtual server replicates the set of active data based on a block level replication technique.

23. The method of claim 1, wherein the virtual server replicates the set of active data based on a compression type parameter.

24. The method of claim 1, wherein the virtual server replicates the set of active data based on a timing parameter.

25. The method of claim 1, wherein the virtual server replicates the set of active data based on a location parameter.

26. The method of claim 1, further comprising:
creating, by the first server, the virtual server based on a server definition formed from a logic executed via the second server, wherein the virtual server is hosted based on the virtual server being created based on the server definition.

27. The method of claim 1, further comprising:
hosting, by the control platform, a control logic for the virtual server after a validation of the virtual server, wherein the control logic enables a control action for a replication process of the virtual server, wherein the control action enables at least one of a pause of the virtual server, a start of the virtual server, a stop of the virtual server, an image of the virtual server, a rebuilding of the virtual server, a run in a failover state of the virtual server, or a failback of the virtual server.

28. The method of claim 1, further comprising:
performing, by the first server, an archiving process on the set of active data such that the set of active data is archived from the virtual server to a third server according to an archive definition formed based on a logic executed on the second server.

29. The method of claim 28, wherein the archiving process defines an information level and a time-line at which the set of active data should be archived, wherein the information level and the time-line is at least one of balanced or factored against a data management capability of the third server.

30. The method of claim 29, wherein the control platform defines a second rule for the set of active data as archived on the third server based on the application executed on the second server.

31. The method of claim 30, wherein the second rule defines at least one of how long the set of active data as archived should be kept on the third server or how much of the set of active data as archived should be kept on the third server.

32. The method of claim 1, further comprising:
enabling, by the control platform, the client to test a virtual private network connectivity between the second server and the first server based on a packet sent through a virtual private network tunnel to the virtual server.

33. The method of claim 1, wherein the virtual server does not replicate an application layer within the second server.

34. The method of claim 1, wherein the virtual server replicates based on the replication engine that is swappable.

35. The method of claim 1, further comprising:
copying, by the first server, the set of active data as replicated onto a third server as the virtual server replicates the set of active data.

36. A system comprising:
a continuity system network including a first physical server and a computing device including a control platform;
the first physical server configured to:
host a virtual server configured to receive a set of active data from a second physical server of a client computing network using a replication engine for the client computing network and replicate the set of active data; and
the control platform of the computing device is configured to:
present a user interface to a client of the client computing network, wherein the first physical server is further configured to:
configure, according to a server definition process, the virtual server based on a rule of the control platform defined by a user entry in the user interface, the rule instructing the virtual server to run at least one application of the second physical server using the set of active data, wherein the user interface includes an online tool that collects client server and network information using a survey form presented to a user, wherein the server definition process is configured to create the virtual server on a virtualization platform based on a server definition generated according to one or more user entries into the survey form, and wherein the server definition process is configured to validate the virtual server created for the virtualization platform according to one or more setup rules for validating server creation; and control, according to the server definition process, a failover to the virtual server from the second physical server based on the rule in response to a failover event, wherein the failover event corresponds to the second physical server.

\* \* \* \* \*